United States Patent [19]

Brandli et al.

[11] 3,721,308
[45] March 20, 1973

[54] SNOWMOBILE SUSPENSION SYSTEM

[75] Inventors: Ronald I. Brandli; James R. Gjovik, both of Roseau, Minn.

[73] Assignee: Textron Inc., Providence, R.I.

[22] Filed: Feb. 4, 1971

[21] Appl. No.: 112,581

[52] U.S. Cl. ...................... 180/5 R, 305/25, 29/155
[51] Int. Cl. ........................................... B62m 27/02
[58] Field of Search ................ 305/24, 25, 16, 17, 18; 180/5 R; 29/155; 244/119

[56] References Cited

UNITED STATES PATENTS

| 3,637,265 | 1/1972 | Valentine | 180/5 R |
| 3,658,392 | 4/1972 | Perreault | 180/5 R |
| 3,485,312 | 12/1969 | Swenson | 180/5 R |
| 2,407,480 | 9/1946 | Dean | 244/119 |
| 3,545,821 | 12/1970 | Erickson | 180/5 R |
| 3,613,810 | 10/1971 | Hetteen | 180/5 R |
| 3,613,811 | 10/1971 | Brandli | 180/5 R |

Primary Examiner—Richard J. Johnson
Attorney—Merchant & Gould

[57] ABSTRACT

A snowmobile slide rail suspension system is shown in which the suspension frame, having spaced side frame members each formed from a pair of metal stampings, is positioned between the upper and lower runs of the drive track. The snowmobile body is supported on the frame by pivotable front and rear arms. A pair of torsion springs have their central portions and one end portion of each secured to the read arms and have their other end portions carried by spring support members extending rearwardly from the front arms at their pivotal connection with the frame, to thereby bias the front and rear arms away from the frame.

10 Claims, 2 Drawing Figures

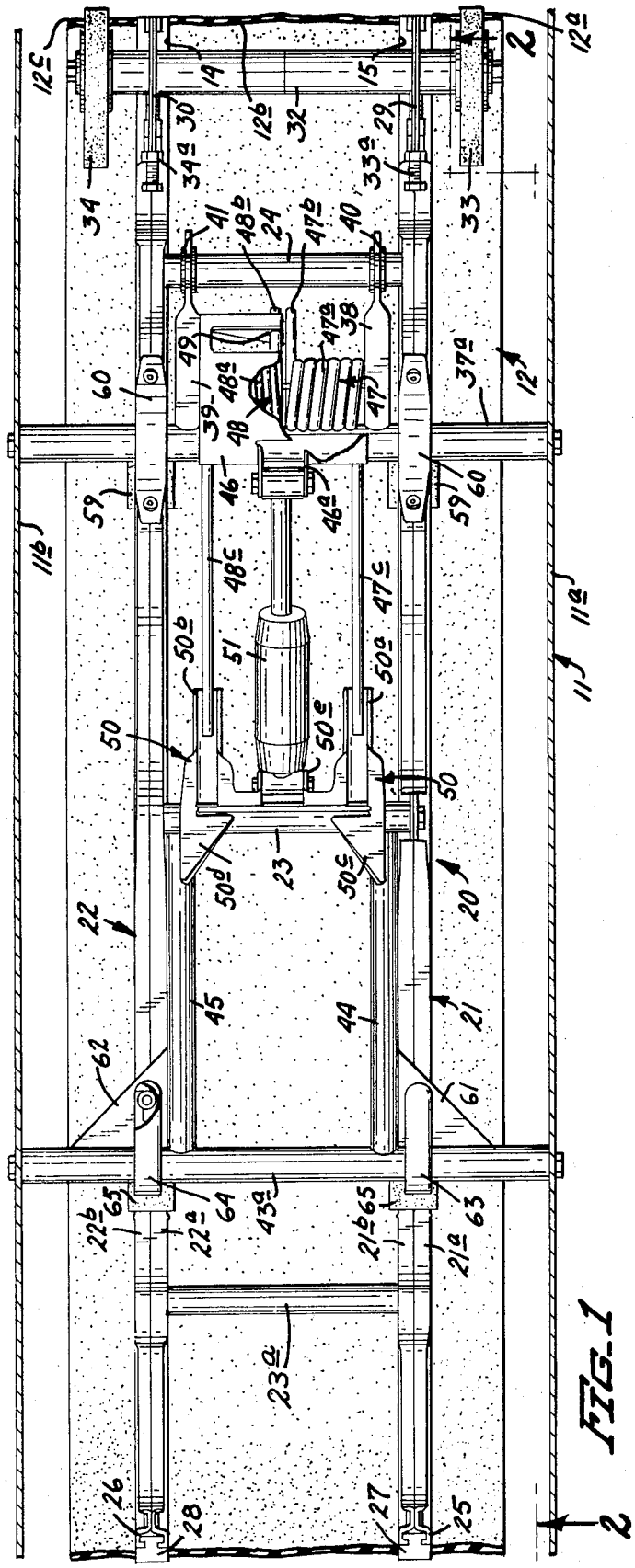
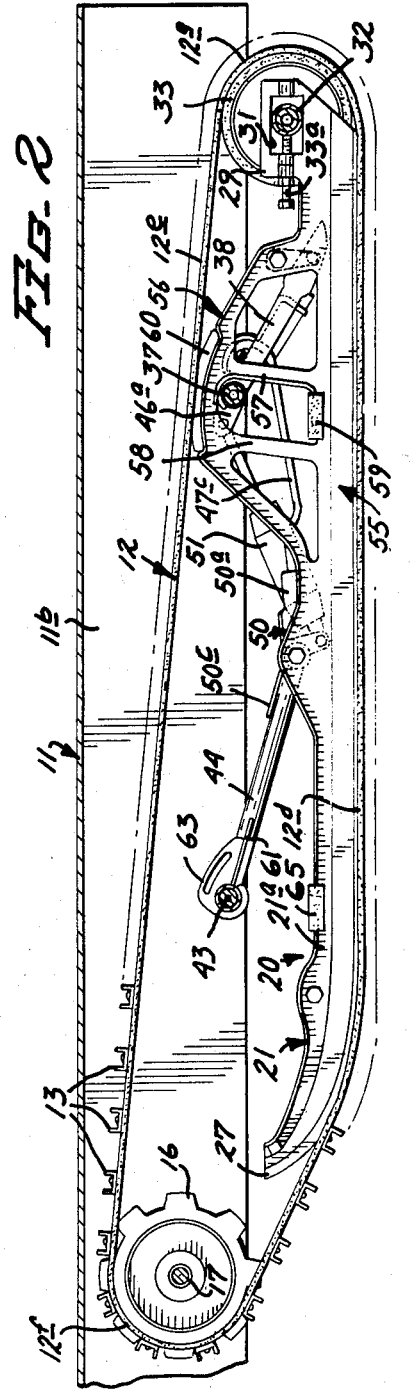
INVENTOR.
RONALD I. BRANDLI
JAMES R. GJOVIK
BY
Merchant & Gould
ATTORNEYS

SNOWMOBILE SUSPENSION SYSTEM

BACKGROUND OF THE INVENTION

1. Field of the Invention

This invention relates generally to suspension systems for vehicles and more particularly relates to an improved snowmobile suspension system.

2. Description of the Prior Art

A number of different slide rail suspension systems have been developed that employ a suspension frame connected to the snowmobile body by front and rear pivotable arms. A number of springs are provided that cooperate with the arms to yieldingly hold the body above the frame. The Swenson et al. U.S. Pat. No. 3,485,312 that issued Dec. 23, 1969 employs downwardly and rearwardly sloping front arms and telescoping rear arms. The telescoping rear arms permit relative longitudinal movements between the body and frame as the frame pivots on the front arms with respect to the body. Separate torsion springs are used with the front and rear arms, respectively.

A more recent prior art suspension system is shown in the Brandli et al. U.S. Pat. application Ser. No. 846,153, filed July 30, 1969 now U.S. Pat No. 3,613,811. The Brandli et al structure employs a much less complicated suspension frame. A front linkage is provided in Brandli et al to limit the pivotal movements of the front arms and a pair of rearwardly located shock absorbers are provided to damp movements of the frame with respect to the body. Front and rear pairs of unconnected torsion springs are used to bias the body away from the frame. The bottom ends of the rear arms are connected to the frame by pivotal link members to provide the necessary relative movement between the frame and body.

SUMMARY OF THE INVENTION

The present invention further simplifies and improves the suspension system shown and described in the previously mentioned Brandli et al application. The frame itself has been made lighter and easier to manufacture by constructing the side frame members from a pair of metal stampings that cooperate to form a downwardly facing, generally C-shaped channel into which a mating slide member is inserted. A single pair of torsion springs provide the necessary spring bias. The springs are mounted so as to coact with both the front and rear arms to yieldingly support the body above the frame. A shock absorber is connected between the front and rear arms to provide a damping action. These and other important features of the present invention will be discussed further in the following specification, in association with the attached drawings.

BRIEF DESCRIPTION OF THE DRAWINGS

FIG. 1 is a top plan view of the suspension system, portions thereof being broken away and portions being shown in section; and FIG. 2 is a reduced scale fragmentary view in side elevation of the suspension system, taken along line 2—2 of FIG. 1, portions thereof being broken away and portions being shown in section.

DESCRIPTION OF THE PREFERRED EMBODIMENT

Referring now to the drawings, wherein like reference numerals are used throughout the several views to indicate like elements of the invention, there is disclosed the tunnel or generally U-shaped rear portion 11 of a snowmobile body which includes two generally vertical side wall portions 11a and 11b to which the suspension frame is mounted. Although the full snowmobile structure is not shown, it is like that shown in the previously-identified Brandli et al application. Mounted beneath and partially within the confines of the inverted, generally U-shaped rear portion 11 is an endless drive track 12. As best shown in FIG. 1, track 12 is formed from three separate endless belts 12a, 12b and 12c that are held together by a plurality of spaced, transversely extending cleats 13 secured by rivets or the like to the outer surface thereof. Preferably, each of the track portions 12a, 12 b and 12c is molded from a single piece of rubber provided with suitable reinforcing materials, although the particular form of track used is not critical to the present invention. The three track portions 12a, 12b and 12c are spaced and in conjunction with the cleats 13 define two rows 14 and 15 of openings for reception of the teeth of a pair of drive sprocket wheels 16, one of which is shown, mounted on a transverse drive shaft 17 journalled at the front end of tunnel 11. The two sprocket wheels 16 ride in the openings 14 and 15 between the track portions, and the teeth thereof engage the cleats 13 to drive the track.

Although not shown on the drawings, one end of the drive shaft 17 is provided with a metal, toothed sprocket wheel for engagement with a drive chain extending from the vehicle transmission. The two sprocket wheels 16 provide not only driving force for the track 12 but also support the front end thereof. Drive track 12 has a lower ground-engaging drive run 12d, an upper return run 12e, a front end portion 12f engaging sprocket wheels 16, and a rear end portion 12g located adjacent the rear end of the body.

An elongated, unitary suspension frame 20 is positioned between drive run 12d and return run 12e. Suspension frame 20 comprises a pair of longitudinally extending, parallel side frame members 21 and 22. Frame members 21 and 22 are held in this spaced relationship by transversely extending cross shaft means 23, 23a and 24. The two side frame members 21 and 22 are each formed from a pair of metal stampings, 21a, 21b and 22a, 22b. Each of the four pieces is stamped from a single piece of steel and as shown in FIG. 1, each piece has a flat portion that bears against the corresponding flat portion of the mating piece, and each of the metal stampings has a flared upper edge portion to lend rigidity thereto. The two stampings in each side frame member 21 and 22 are bolted and/or welded together so that each of the side frame members is relatively rigid. The two side frame members 21 and 22 are then bolted to the cross shafts 23, 23a and 24 to space them a distance apart corresponding to the distance between the openings 14 and 15 in the track 12.

Each of the side frame members 21 and 22 is formed to provide a downwardly opening, generally C-shaped channel 25, 26, as shown in FIG. 1. Mounted in the channels 25 and 26 are smooth, track-engaging slide members 27 and 28, each of which is provided with grooves in the opposite side walls thereof for engagement with the edges of the associated C-shaped channel. The edges of the channel engage the grooves along the length of the side frame members to securely retain the slide members in position to engage the inner surfaces of the cleats 13 in the openings 14 and 15 in the track 12. The slide members 27 and 28 are made from a material having a low coefficient of friction, such as ultra high molecular weight polyethylene.

The rear ends of each of the side frame members 21 and 22 are formed to provide upstanding support plates 29 and 30, each having a horizontally extending slot 31 through which an idler shaft 32 extends. A pair of idler wheels 33 and 34 are rotatably mounted on the opposite ends of shaft 32. Support plates 29 and 30 carry threaded adjustment devices 33a and 34a to adjust the position of shaft 32 in openings 31. Drive track 12 is entrained over this rear idler assembly with the two idler wheels 33 and 34 engaging the inner surface of track portions 12a and 12c. The threaded adjustment devices 33a and 34a position the idler wheels forwardly or rearwardly with respect to the frame 20 to align and properly tension the drive track. It is noted that this rear idler assembly is supported solely by suspension frame 20 and is not in any way directly connected to the vehicle body.

In the previously-mentioned Brandli et al prior art application, the front ends of the side frame members were provided with idler wheels to aid in causing the track to smoothly engage the front ends of the slide rails. In the present invention, the forward idler wheels have been eliminated, but the front ends of the side frame members 21 and 22 are abruptly curved upwardly so that a substantial end portion of each does not engage the track. The design is such that the track will always engage the slide rails slightly rearwardly of their front tips. Because smooth engagement of the front ends of the slide rails is thus insured, the front idlers are no longer needed.

Extending laterally across rear body portion 11, through openings in sidewalls 11a and 11b, is a support shaft 37, that extends below the return run 12e and above the drive run 12d. The ends of shaft 37 are threaded and are secured to the rear portion 11 by suitable threaded nuts as shown in FIG. 1. A tubular sleeve 37a is mounted on shaft 37 and extends between the two side walls. A pair of spaced rear suspension arms 38 and 39 are welded to sleeve 37a and extend downwardly and rearwardly therefrom.

Shaft means 24 also includes a rotatable sleeve to which is secured two spaced pairs 40 and 41 of flat link members that extend generally downwardly therefrom. The lower ends of the two suspension arms 38 and 39 extend between a corresponding pair of the link members 40 and 41 and are secured for pivotal movements with respect thereto by means of suitable bolts. This linkage permits suspension frame 20 to move a predetermined amount longitudinally relative to the snowmobile body, but prevents more than an insignificant amount of relative lateral movement between the frame and body.

Another cross shaft or mounting shaft 43 having a sleeve 43a mounted thereon extends across the body between the upper and lower runs of drive track 15, as previously described for shaft 37. Shaft 43 is positioned above the front end of frame 20 and rearwardly of the drive sprocket wheels 16. Welded to the opposite ends of sleeve 43a are a pair of control arms 44 and 45 that extend downwardly and rearwardly therefrom for connection at their lower ends to a tubular sleeve on the next rearwardly located cross shaft means 23. The upper ends of control arms 44 and 45 are thus pivotally connected with respect to the vehicle body, and the lower ends are pivotally connected with respect to the suspension frame 20.

A saddle member 46 is connected to and extends between the tops of sleeve 37a and rear suspension arms 38 and 39. Preferably, saddle member 46 is welded thereto. A pair of torsion springs 47 and 48 are provided having respective central portions 47a, 48a, rear end portions 47b, 48b, and front end portions 47c, 48c. The central portions 47a and 48a of the torsion springs are positioned beneath saddle member 46 immediately rearwardly of sleeve 37a. As shown in FIG. 2, a downwardly opening depression is formed in saddle member 46 into which the central portions 47a and 48a extend. The rear edge portion of saddle member 46 extends downwardly at right angles with respect to the main portion thereof, and said rear edge portion is provided with a centrally located opening 49 through which extend the side-by-side rear end portions 47b and 48b of the two torsion springs. The saddle member 46 thus supports both the central portions and the rear end portions of the two torsion springs.

Welded to the sleeve on cross shaft means 23 is a spring support member 50 having spaced channel portions 50a and 50b extending rearwardly from the pivotal connection of control arms 44 and 45 with frame 20. Upwardly opening channel portions 50a and 50b are in line with the forwardly extending end portions 47c and 48c of the torsion springs. End portions 47c and 48c extend over and are supported by channel portions 50a and 50b respectively. As viewed in FIG. 2, the downward thrust of the two end portions 47c and 48c tends to bias control arms 44 and 45 in a clockwise direction with respect to cross shaft means 23. Downward movements of the body with respect to the frame thus increase the spring tension.

The opposite ends of spring support member 50 are provided with forwardly extending, triangular-shaped brace portions 50c and 50d that are welded to the top surfaces of cross shaft means 23 and control arms 44, 45. Also formed as an integral part of spring support member 50 is a centrally located, generally downwardly extending bracket assembly 50e, to the bottom end of which is pivotally secured the forward end of a shock absorber 51. Formed as an integral part of the front edge of saddle member 46 is a generally forwardly extending bracket assembly 46a to which the rear end of shock absorber 51 is pivotally attached. Shock absorber 51 thus acts to damp the pivotal movements of both the front control arms and the rear suspension arms.

As best shown in FIG. 2, at least a rear portion of each of the side frame members 21 and 22 comprises a lower frame portion 55 for engaging the lower run of the track and an upper frame portion 56 for periodically engaging and supporting the upper run of the track. The lower and upper frame portions 55 and 56 are connected by generally vertically extending support beams 57 and 58 having an opening between them through which the laterally extending shaft 37 extends. The bottom edge of the opening is provided with a resilient snubber 59 that acts to limit the upward movement of the frame 20 with respect to the body. The upper edge of the opening between the beams 57 and 58 acts to limit the downward movement of the frame with respect to the body. A smooth, curved slide member 60 is mounted to the top surface of each of the upper frame portions 56 for periodic smooth sliding engagement with the upper run 12e of the drive track. When power is being applied, the upper run 12e is taut and will not normally engage the slide members 60. Under other conditions, however, the upper run 12e may slacken so that its bottom surface will engage portions of the suspension frame. The slide members 60 act to reduce wear and friction on and between the track and frame. In some situations, the belt may slacken sufficiently to slap against sleeve 43a. A pair of triangular braces 61 and 62 are welded between the outer edges of control arms 44 and 45 and sleeve 43a. A pair of smooth slide members 63 and 64 are riveted to the top surfaces of braces 61 and 62 respectively and are also formed to have a curved front portion that extends partially around sleeve 43a, as shown in FIG. 2. Slide members 63 and 64 are formed from a plastic material as are slides 60.

Another resilient snubber member 65 is mounted on each of the side frame members 21 and 22 directly beneath sleeve 43a to resiliently limit the upward movement of the frame 20 with respect to the body.

When the drive track 12 encounters an obstacle, it will be forced upwardly against the slide rails 27 and 28 which in turn will force the suspension frame 20 upwardly with respect to the snowmobile body. The front control arms 44 and 45 will thus pivot upwardly with respect to the body. This upward movement of the frame is resisted by the forward end portions 47c and 48c of the torsion springs. As the track passes forwardly over the obstacle, the front end portions 47c and 48c will again force the front end of the suspension frame downwardly away from the body. The end portions 47c and 48c are free to slide within the channel portions 50a and 50b to accommodate the pivotal movements of the front control arms. As the obstacle moves toward the rear of the vehicle, the rear suspension arms 38 and 39 will be pivoted upwardly toward the body again increasing the compression of the two torsion springs. As the rear end of the suspension frame 20 is pushed upwardly, compressing the springs, the downward pressure exerted by the front end portions 47c and 48c is increased tending to force the front end of the frame downwardly away from the body. It should also be pointed out that when the front end of the frame is forced upwardly to compress the front end portions 47c and 48c, the downwardly directed forces of the rear end portions 47b and 48b are increased to force the rear end of the suspension frame away from the body. This coaction between the front and rear arms and the suspension springs tends to always keep the entire length of the slide rails in contact with the track, thus tending to keep the track tight. Of course, the shock absorber 51 damps the action of both sets of arms.

The present invention provides a snowmobile suspension system that is lighter than prior art systems, and that is less expensive and easier to manufacture. A single pair of torsion springs and a single shock absorber are used in conjunction with the front and rear arms to suspend the frame from the body. These and other features of the invention are defined in the appended claims.

What is claimed is:

1. In a snowmobile having an elongated unitary body and having an endless drive track with a lower ground-engaging run and an upper return run, and having drive means engaging the front end of said drive track, an improved suspension system, comprising:
   a. a unitary suspension frame positioned between said upper and lower runs including means for engaging the lower run of said track;
   b. downwardly and rearwardly sloping rear suspension arm means pivotally mounted on said body;
   c. means pivotally attaching said rear suspension arm means to a rear portion of said frame for limited relative longitudinal movements between said frame and said body;
   d. downwardly and rearwardly sloping control arm means pivotally connected between a forwardly located portion of said frame and said body to increase the distance therebetween upon said frame moving forwardly with respect to said body; and
   e. a torsion spring having a central portion and two end portions, said central portion and one end portion thereof being mounted on said suspension arm means and the other end portion thereof being mounted on a spring support member rigidly secured to and extending rearwardly from the control arm means to thereby cooperate with said suspension arm means and control arm means in yieldably supporting said body on said suspension frame.

2. The apparatus of claim 1 wherein said suspension frame comprises a pair of spaced side frame members connected by transversely extending cross shafts, each of said side frame members being formed from a pair of metal stampings having corresponding flat portions that fit together and flared edge portions to lend rigidity thereto, wherein the bottom of each of said side frame members is formed to provide a downwardly opening, generally C-shaped channel and wherein a smooth track engaging slide member having grooves in opposite side walls thereof for engagement with the edges of said C-shaped channel is securely retained within said channel.

3. The apparatus of claim 1 wherein said rear suspension arm means comprises a pair of spaced, sloping suspension arms, with a saddle member being connected to and extending between said arms, wherein said central portion of said torsion spring is positioned beneath said saddle member, wherein said pair of suspension arms are pivotally mounted at their upper ends to a laterally extending cross shaft mounted on said body and slope rearwardly and downwardly therefrom for connection to said frame, and wherein said saddle member has a downwardly opening depression formed therein rearwardly of said cross shaft in which said central portion of said spring is positioned.

4. The apparatus of claim 3 wherein said suspension frame comprises a pair of spaced side frame members connected by transversely extending shafts, wherein at least a rear portion of each of said side frame members comprises a lower frame portion for engaging the lower run and an upper frame portion for periodically engaging and supporting the upper run, said frame portions having an opening between them through which said laterally extending cross shaft extends, said upper and lower frame portions engaging said cross shaft upon movements of said frame to limit the movement of said frame with respect to said body, and a smooth slide member mounted to the top surface of each upper frame portion and to the top end of said control arm means for smooth sliding engagement with said upper run.

5. The apparatus of claim 4 wherein a pair of torsion springs are provided, having rearwardly extending side-by-side end portions, wherein said saddle member has an opening formed in a rearwardly located edge thereof, and wherein said rearwardly extending end portions extend through said opening.

6. The apparatus of claim 5 wherein said pair of torsion springs have forwardly extending, spaced end portions, wherein said control arm means is pivotally connected to said frame and includes said spring support member extending rearwardly from said pivotal connection, and wherein said forwardly extending end portions are supported by said spring support member.

7. The apparatus of claim 6 wherein a shock absorber is connected between a forwardly located edge of said saddle member and an extension of said spring support member.

8. In a vehicle having an elongated body with an endless drive track having a lower ground-engaging run and an upper return run, and having drive means engaging the front end of said drive track, an improved suspension system, comprising:
   a. a suspension frame positioned between said upper and lower runs;
   b. means including said frame for engaging and supporting the lower run and the rear end of said track;
   c. rearwardly sloping suspension arm means;
   d. means connecting said suspension arm means between a rearwardly located portion of said body and frame to provide linkage permitting a predetermined amount of relative longitudinal movement between said body and frame;
   e. rearwardly sloping control arm means pivotally mounted between a forwardly located portion of said frame and said body;
   f. a torsion spring having a central portion and forwardly and rearwardly extending end portions;
   g. means securing said central portion and said rearwardly extending end portion to said suspension arm means; and
   h. said control arm means including means to support the forwardly extending end portion of said spring so as to cause said spring to yieldingly bias both said arm means away from said frame.

9. The apparatus of claim 8 wherein said suspension arm means comprise a pair of spaced suspension arms having a saddle member connected between them, and wherein a pair of torsion springs are provided, each having a central portion positioned beneath said saddle member and an end portion secured thereto.

10. The apparatus of claim 9 wherein said control arm means includes spring support means extending rearwardly from the pivotal connection between said control arm means and frame, and wherein a forwardly extending end portion of each said torsion spring is carried by said spring support means.

* * * * *